(12) United States Patent  (10) Patent No.: US 12,517,808 B2
Parees et al.  (45) Date of Patent: Jan. 6, 2026

(54) MANAGING RESOURCES USED DURING A DEVELOPMENT PIPELINE

(71) Applicant: Red Hat, Inc., Raleigh, NC (US)

(72) Inventors: Benjamin Michael Parees, Durham, NC (US); Clayton Palmer Coleman, Raleigh, NC (US); Derek Wayne Carr, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 99 days.

(21) Appl. No.: 17/343,540

(22) Filed: Jun. 9, 2021

(65) Prior Publication Data

US 2021/0294730 A1  Sep. 23, 2021

Related U.S. Application Data

(63) Continuation of application No. 15/988,761, filed on May 24, 2018, now Pat. No. 11,126,541.

(51) Int. Cl.
*G06F 9/44* (2018.01)
*G06F 8/20* (2018.01)
*G06F 11/3668* (2025.01)

(52) U.S. Cl.
CPC ............ *G06F 11/3684* (2013.01); *G06F 8/20* (2013.01)

(58) Field of Classification Search
CPC ...... G06F 8/65; G06F 16/182; G06F 2113/10; G06F 16/278; G06F 9/4881; G06F 8/20; G06F 11/368; G06Q 10/087; G06Q 2220/00; G06Q 10/06395
USPC ....................................................... 717/124
See application file for complete search history.

(56) References Cited

U.S. PATENT DOCUMENTS

| | | | |
|---|---|---|---|
| 9,251,115 B2 | 2/2016 | Bursell | |
| 9,524,111 B1 | 12/2016 | Manden et al. | |
| 9,563,479 B2 | 2/2017 | Ferris et al. | |
| 9,722,867 B2 | 8/2017 | Zhang | |
| 10,061,371 B2 | 8/2018 | Geffin et al. | |

(Continued)

FOREIGN PATENT DOCUMENTS

| | | |
|---|---|---|
| CN | 102932498 B | 8/2016 |
| WO | 2017010922 A1 | 1/2017 |

OTHER PUBLICATIONS

Aslam et al., "Information Collection Centric Techniques for Cloud Resource Management: Taxonomy, Analysis and Challenges", Department of Computer Science, Comsats Institute of Information Technology, Park Road, Chak Shahzad, Islamabad, Pakistan; Center of Excellence in Information Assurance (CoEIA), King Saud University, Saudi Arabia, Journal of Network and Computer Applications, Jun. 10, 2017, 20 pages.

(Continued)

*Primary Examiner* — Chuck O Kendall
(74) *Attorney, Agent, or Firm* — Womble Bond Dickinson (US) LLP (57) ABSTRACT

Managing resources used during a development pipeline. A method of the disclosure includes analyzing historical resource usage of an application development system during different stages of a development pipeline for an application. The application development system includes a set of computing resources. The method also includes configuring the set of computing resources of the application development system for a later stage of the development pipeline based on an estimated resource usage.

20 Claims, 6 Drawing Sheets

(56) References Cited

U.S. PATENT DOCUMENTS

| | | | | |
|---|---|---|---|---|
| 10,318,285 B1* | 6/2019 | Jodoin | ............... | G06F 11/3612 |
| 2006/0059253 A1* | 3/2006 | Goodman | ............. | G06Q 10/10 |
| | | | | 709/223 |
| 2007/0240161 A1 | 10/2007 | Prabhakar et al. | | |
| 2011/0066893 A1* | 3/2011 | Bassin | .................. | G06Q 10/06 |
| | | | | 714/E11.217 |
| 2019/0294528 A1* | 9/2019 | Avisror | .............. | G06F 11/3688 |

OTHER PUBLICATIONS

Gonzalez et al., "Cloud Resource Management: Towards Efficient Execution of Large-Scale Scientific Applications and Workflows on Complex Infrastructures", Polytechnic School, University of Sao Paulo (USP), Sao Paulo/SP, Brazil; Santa Catarina State University (UDESC), Joinville/SC, Brazil, Journal of Cloud Computing: Advances, Systems and Applications, vol. 6, No. 13, 2017, 20 pages.

"Cloud Management—An Overview", Oracle Enterprise Manager Cloud Administration Guide, 12cRelease 2, https://docs.oracle.com/html/E28814_01/cloud_overview_new.htm, Nov. 24, 2107, 11 pages.

\* cited by examiner

MANAGING RESOURCES USED DURING A DEVELOPMENT PIPELINE

RELATED APPLICATIONS

This application is a continuation of U.S. patent application Ser. No. 15/988,761, filed May 24, 2018, which is herein incorporated by reference in its entirety.

TECHNICAL FIELD

Aspects of the present disclosure relate to development pipelines, and more particularly, to managing resources used during different stages of an application development pipeline.

BACKGROUND

An application may be one or more programs (e.g., computer programs), software, etc., that may be used by users, other applications, devices, etc., to perform various tasks, actions, functions, operations, methods, processes, calculations, etc. Examples of applications include web applications, enterprise applications, consumer applications, mobile applications, etc. An application may be divided into multiple components, modules, portions, etc. Each component, module, portion, etc., may perform different functions, operations, actions, processes, methods, etc., for the application, and may provide different services, functionalities, or resources for the application.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, an application may be one or more programs (e.g., computer programs), software, etc., that may be used by users, other applications, devices, etc., to perform various tasks, actions, functions, operations, methods, processes, calculations, etc. The application may be divided into components, modules, portions, etc., that may perform different functions, operations, actions, processes, methods, etc., for the application, and may provide different services, functionalities, or resources for the application. The process or cycle for developing (e.g., created, coded, implemented, etc.), testing, and maintaining the application (or the modules and components of the application) may be referred to as a development pipeline. The development pipeline may also be referred to as an application development pipeline, a development cycle, an application development cycle, etc.

A development system may be used to develop, test, deploy, or maintain an application. For example, a development system may be used by programmers or developers to implement (e.g., code) the application. In another example, the development system may be used by programmers or developers to test portions or all of the application. In a further example, the development system may be used to deploy the application to users (e.g., to end users of the application). The development pipeline for an application may include various stages or phases. Each stage or phase of the development pipeline may use computing resources of the development system. For example, each stage or phase of the development pipeline may use memory (e.g., random access memory (RAM)), storage space, computing devices, network bandwidth, etc., of the development system.

If the computing resources used by each stage are allocated when the stage is reached, this may cause delays in the development pipeline. For example, a next stage in the development pipeline may not be able to start until the computing resources (e.g., virtual machines, storage space, memory, etc.) for the next stage are allocated. In addition, if the wrong amount of computing resources are allocated or reserved for the next stage, this may waste computing resources and may also cause delays in the development pipeline. For example, if too many computing resources are allocated for a next or later stage, then the excess computing resources (e.g., excess virtual machines) may be wasted. In another example, if too few computing resources are allocated for the next or later stage, then the next or later stage may take longer to complete due to the time taken to allocate additional computing resources for the next or later stage. Furthermore, many development systems do not automatically allocate or reserve the resources used by later stages of the development pipeline which may cause delays and inconvenience the users (e.g., programmers, developers, coders, testers, etc.) of the development system.

The present disclosure addresses the above-noted and other deficiencies by analyzing the computing resources used in previous iterations of the development pipelines for one or more applications. This may allow for a better prediction or estimate of the computing resources that may be used in each stage of the development pipeline. This may also allow for better prediction of the correlation between the computing resources used in the different stages (e.g., the amount of computing resources used in one stage may be indicative of the amount of computing resources used in a second stage). The present disclosure also addresses the above-noted and other deficiencies by determining an estimated resource usage for the development system and configuring the resources of the development system (e.g., allocating or reserving resources) for next or later stages, during a current stage of the development pipeline. This may reduce the amount of delays when the development system moves to the later or next stage of the pipeline. This may further allow the users of the development system to have some advanced warning that there may be insufficient resources for a next or later stage, which in turn allows the users to request or allocate additional resources for the development system.

Figure 1:
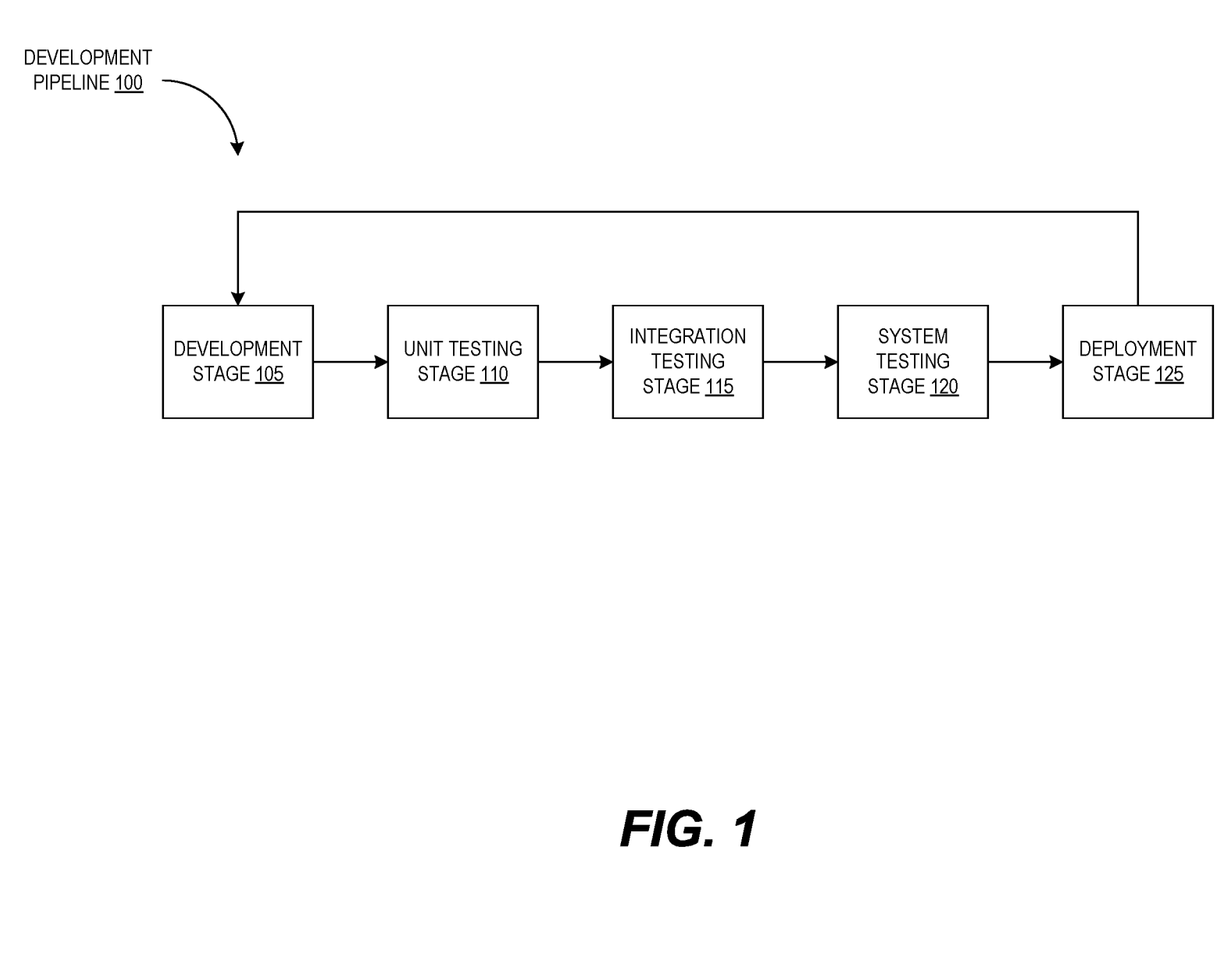
FIG. 1 is a block diagram that illustrates an example development pipeline, in accordance with some embodiments of the present disclosure.

FIG. 1 is a block diagram that illustrates an example development pipeline 100, in accordance with some embodiments of the present disclosure. As discussed above, an application may be one or more programs (e.g., computer programs), software, software applications, etc., that may be used by users, other applications, devices, etc., to perform various tasks, actions, functions, operations, methods, processes, calculations, etc. The process or cycle for developing (e.g., created, coded, implemented, etc.), testing, deploying, and maintaining an application may be referred to as a development pipeline. The development pipeline (or process) may be a cyclical pipeline, as discussed in more detail below. One type of development pipe line may be a continuous integration continuation delivery (CI/CD) pipeline. A CI/CD pipeline may be a pipeline or process where an application, or modules and components of the application, are built (e.g., compiled), tested, and deployed (e.g., released to users) in shorter time periods. For example, new code for the application may be built, tested, and deployed every few hours, every day, or every appropriate time period. The testing of the application, or modules and components of the application, may be performed when code (e.g., source code, programing code, etc.) is checked into a version control system (e.g., a source control system, a code repository, etc.). For example, testing of the application may be performed automatically when new code for the application is checked in. The deployment of the application, or modules and components of the application may be performed when the testing of the application (or modules and components of the application) has been completed. For example, the application may be automatically deployed when the testing of the application has been completed.

In one embodiment, the development pipeline 100 illustrated in FIG. 1 may be an example of a CI/CD pipeline. The development pipeline 100 includes a development stage 105, a unit testing stage 110, an integration testing stage 115, a system testing stage 120, and a deployment stage 125. The stages illustrated in FIG. 1 are merely examples, and different stages may be used in the development pipeline 100 in other embodiments. For example, additional stages may be included in the development pipeline 100. In another example, one of the stages in the development pipeline 100 may be divided into multiple stages.

In one embodiment, developers, coders, programmers, etc., may modify the application during the development stage 105. For example, developers may write code, add code, update code, modify code, fix bugs, add new features, add security fixes, enhance existing features, etc., during the development stage 105. The development stage 105 may end when the developers, coders, programmers, etc., check in code to a version control system (e.g., a source control system, a code repository, etc.). In one embodiment, one or more components, modules, units, portions, etc., of the application may be testing during the unit testing stage 110. For example, smaller portions (e.g., single modules) of the application may be tested during the unit testing stage 110. The unit testing stage 110 may start after the development stage 105. For example, unit tests (for the unit testing stage 110) may be automatically started or performed after the developers, coders, programmers, etc., check in their code to the version control system.

In one embodiment, individual components, modules, units, portions, etc., of the application may be combined and tested as a group during the integration testing stage 115. For example, multiple modules (e.g., two, three, or some other appropriate number of modules) may be combined and tested together as a single module. The integration testing stage 115 may start after the unit tests for the individual components, modules, units, portions, etc., of the application that are to be combined and tested as a group are completed. For example, integration testing stage 115 may start after all or a threshold number of the unit tests for the individual components, modules, units, portions, etc., of the application, have passed.

In one embodiment, the complete or integrated application may be tested during the system testing stage 120. During the system testing stage 120, the application may be tested to determine if the application is in compliance with different requirements. For example, the application may be tested to determine whether certain features operate as specified in a design document. In another example, the application may be tested to determine whether the application can perform different operations, functions, actions, etc., within a specified period of time.

In one embodiment, the application may be deployed (e.g., installed, updated, etc.) onto various computing devices during the deployment stage 125. For example, the application or portions of the application may be installed on to different server computing devices, client computing devices, etc., during the deployment stage 125. The deployment stage 125 may include various types of deployments. For example, the deployment stage 125 may include a test deployment where the application is deployed to a subset of computing devices that have the application installed. This may allow the developers to see how the application performs on the subset of computing devices before deploying the application to all of the computing devices that have the application installed.

In one embodiment, the development pipeline 100 may be a cyclical pipeline or processes. For example, the development pipeline 100 may proceed from the deployment stage 125 back to the development stage 105, after the deployment stage 125 has been completed. Thus, a later stage in the development pipeline 100 may refer to an earlier stage in the development pipeline. For example, a later stage after the deployment stage 125 may refer to the development stage 105 of the unit testing stage 110.

As discussed above, the development pipeline 100 may include fewer, more, or different stages than those illustrated in FIG. 1. For example, the development pipeline 100 may include a stress testing stage (e.g., tests are performed repeatedly on the application or modules of the application), a soak testing stage (where the tests are performed over a longer period of time to determine whether an application or modules of the application are stable), etc. In another example, the deployment stage 125 may be divided into multiple stages (e.g., the deployment stage 125 may be divided into a small scale deployment stage to test out the deployment of the application by deploying the application to a subset of users, and a full scale deployment stage where the application may be deployed to all users of the application).

Figure 2:
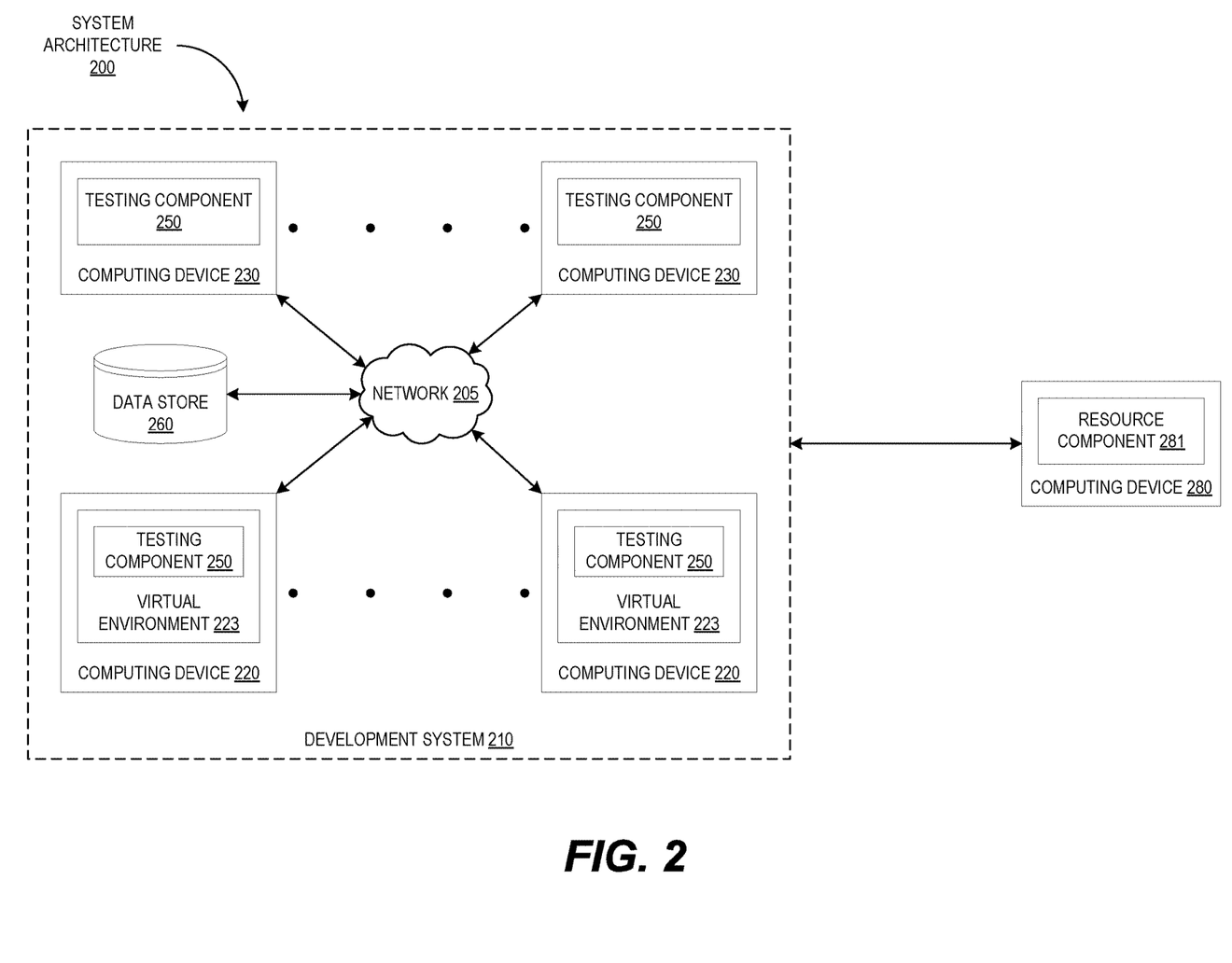
FIG. 2 is a block diagram that illustrates an example system architecture, in accordance with some embodiments of the present disclosure.

FIG. 2 is a block diagram that illustrates an example system architecture 200, in accordance with some embodiments of the present disclosure. The system architecture 200 includes a development system 201 and computing device 280. The development system 201 includes computing devices 220 and 230, a data store 260 and a network 205. The computing devices 220 and 230, and the data store 260 may be coupled to each other (e.g., may be operatively coupled, communicatively coupled, may communicate data/ messages with each other) via network 205. Network 205 may be a public network (e.g., the internet), a private network (e.g., a local area network (LAN) or wide area network (WAN)), or a combination thereof. In one embodiment, network 205 may include a wired or a wireless infrastructure, which may be provided by one or more wireless communications systems, such as a wireless fidelity (Wi-Fi) hotspot connected with the network 205 and/or a wireless carrier system that can be implemented using various data processing equipment, communication towers (e.g. cell towers), etc. The network 205 may carry communications (e.g., data, message, packets, frames, etc.) between computing devices 220 and 230, and the data store 260. The data store 260 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The computing device 280 may be coupled to the development system 201 via another network or via the network 205. Although the computing device 280 (and the resource component 281) is illustrate as separate from the development system 210, the computing device 280 (and the resource component 281) may be part of the development system 210 in other embodiments.

Each computing device (e.g., computing devices 220, 230, and 280) may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, laptop computers, tablet computers, smartphones, set-top boxes, etc. In some examples, the computing devices may comprise a single machine or may include multiple interconnected machines (e.g., multiple servers configured in a cluster). Each computing device may execute or include an operating system (OS), as discussed in more detail below. The OS of a computing device may manage the execution of other components (e.g., software, applications, etc.) and/or may manage access to the hardware (e.g., processors, memory, storage devices etc.) of the computing device.

As illustrated in FIG. 2, computing devices 220 include virtual environments 223. In one embodiment, a virtual environment 223 may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. A VM may be, for example, a hardware emulation, a full virtualization, a para-virtualization, and an operating system-level virtualization VM. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. For example, the hypervisor, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor 212 may present other software (i.e., "guest" software) the abstraction of one or more virtual machines (VMs) that provide the same or different abstractions to various guest software (e.g., guest operating system, guest applications). VM 213 may execute guest software that uses an underlying emulation of the physical resources (e.g., virtual processors and guest memory).

In another embodiment, a virtual environment 223 may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container 223 may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. For example, the container engine may multiplex the binaries and/or libraries of the host OS between multiple containers. The container engine may also facilitate interactions between the container and the resources of the computing device. For example, the container engine may manage requests from container to access a memory (e.g., a RAM) of the computing device 110. In another example, the container engine may manage requests from the container to access certain libraries/binaries of the host OS. The container engine may also be used to create, remove, and manage containers. In one embodiment, the container engine may be a component of a host operating system. In another embodiment, container engine may run on top of a host operating system, or may run directly on host hardware without the use of a host operating system.

As discussed above, the development system 210 may be used to develop, update, test, deploy, and maintain one or more applications (e.g., software, software applications, apps, web applications, mobile applications, mobile apps, etc.). Also as discussed above, the process of developing, testing, deploying, etc., applications may be referred to as a development pipeline. The development pipeline may have various stages (e.g., phases) and each stage may use resources (e.g., computing resources, such as RAM, storage space, processing power, network bandwidth, computing devices, VMs, containers, etc.) of the development system 210.

In one embodiment, the resource component 281 may analyze the historical resource usage of the development system 210. For example, the resource component 281 may analyze the computing resources previously used by the development system 210 during different stages of the development pipelines for one or more applications. As discussed above, the development system 210 includes computing resource (e.g., a set of computing resources), such as computing devices, processing power (e.g., processing devices, CPUs, virtual processing devices, etc.), VMs, containers, memory (e.g., RAM), storage space (e.g., disk space, hard drive space, flash drive space, etc.), network bandwidth, etc. The resource component 281 may analyze the number of computing devices, the amount of memory (e.g., the amount of RAM), the amount of storage space (e.g., the amount of hard drive space), the amount of data transmitted and received via the network 205, etc., during the development stage, unit testing stage, integration testing stage, system testing stage, and deployment stage of the development pipeline.

In some embodiments, the resource component 281 may determine correlations, relationships, dependencies, etc., between the amounts of computing resources used in different stages of the development pipeline, based on the analysis of the historical resource usage. For example, the resource component 281 may determine that there is generally a linear increase in computing resource usage as the development stage progresses through the development pipeline. In another example, the resource component 218 may determine that one stage of the development pipeline uses a certain percentage (e.g., 75%, 125%, or some other appropriate percentage) of the computing resources used by another stage of the development pipeline. The resource component 281 may use various techniques, methods, algorithms, etc., to determine correlations, relationships, dependencies, etc., between the amounts of computing resources used in different stages of the development pipeline for various applications. For example, the resource component 281 may use machine learning, artificial intelligence, statistical models, neural networks, clustering techniques, etc.

In one embodiment, the resource component 281 may determine the current resource usage for a current stage of the development pipeline for an application. For example, an application may currently be at a particular stage of the development pipeline for the application (e.g., a development stage, an integration testing stage, etc.). The resource component 281 may determine the number of computing devices 220 or 230 used, the number of virtual environment 223 used, the amount of memory in the computing devices 220 or 230, the number of processing devices, etc., used for the particular stage of the development pipeline (e.g., for the current stage).

In one embodiment, the resource component 281 may determine an estimated resource usage for a later stage of the development pipeline for the application. For example, the resource component 281 may analyze previous iterations of the development pipeline to determine the amount or number of resources used for the same stage of the development pipeline (e.g., for the later or particulate stage in previous iterations of the development pipeline). In another example, the resource component 281 may determine whether the current stage of the development pipeline may provide one or more indications of the amount or number of resources that may be used in the later stage of the development pipeline. In a further example, the resource component 281 may analyze computing resources used in development pipelines for other applications (e.g., other applications that may perform similar functions, may use similar libraries or software modules, etc.).

In some embodiments, the later stage of the development pipeline may be a next stage (e.g., the very next stage) in the development pipeline of the application. In other embodiments, the later stage of the development pipeline may be not be a next stage but may be after the current stage in the development pipeline of the application. For, the resource component 281 may determine an estimated resource usage for one or more a unit testing stage, an integration testing stage, a system testing stage, or a deployment stage (e.g., for a later stage) during a development stage (e.g., a current stage). In another example, the resource component 281 may determine an estimated resource usage for one or more an integration testing stage, a system testing stage, or a deployment stage (e.g., for a later stage) during a unit testing stage (e.g., a current stage). In a further example, the resource component 281 may determine an estimated resource usage for one or more a system testing stage and a deployment stage (e.g., for a later stage) during an integration testing stage (e.g., a current stage). In yet another example, resource component 281 may determine an estimated resource usage for a deployment stage (e.g., for a later stage) during a system testing stage (e.g., a current stage).

In one embodiment, the resource component 281 may determine the estimated resource usage for a later stage (e.g., the next stage, a stage that is two stages later than the current stage, etc.) while the development system 210 is performing functions, operations, actions, tasks, methods, etc., for a current stage. For example, while the development system 210 is performing one or more units tests during a unit testing stage (e.g., a current stage), the resource component 281 may simultaneously determine the estimated resource usage for an integration testing stage (e.g., a later stage or a next stage). In another example, while the development system 210 is performing one or more units tests during an integration testing stage (e.g., a current stage), the resource component 281 may simultaneously determine the estimated resource usage for deployment stage (e.g., a later stage). In some embodiments, the resource component 281 may automatically determine the estimated resource usage for the later stage (or the next stage) at a certain point or time period within the current stage. For example, resource component 281 may automatically determine the estimated resource usage for the later stage when the development system 210 is 75% of the way through the current stage, or within 10 minutes of finishing the current stage.

In one embodiment, the resource component 281 may determine whether the computing resources of the development system 210 are sufficient for the later stage of the development pipeline. The resource component 281 may determine whether the computing resources of the development system 210 are sufficient for the later stage based on the estimated resource usage determined (e.g., calculated) for the later stage. For example, the resource component 281 may determine an estimated amount of resources (e.g., an estimated amount of RAM, storage space, processing devices, client devices, VMs, etc.) that may be used during the later stage of the development pipeline. The resource component 281 may determine whether the development system 210 has enough resources (e.g., has sufficient resources) for the next stage. For example, the resource component 281 may determine whether there are enough free or available resources for the next stage. In another example, the resource component 281 may determine whether the total resources of the development system (e.g., both currently used and free resources) are sufficient for the next or later stage.

In one embodiment, the resource component 281 may provide an indication to one or more users of the system architecture 200, in response to determining that the computing resources of development system are not sufficient for later stage of the development pipeline based on the estimated resource usage. For example, the resource component 281 may estimate that two gigabytes of storage space may be used by the integration testing stage (e.g., a next stage or a later stage in the application development pipeline) because one gigabyte of storage space used during the unit testing stage (e.g., a current stage). The resource component 281 may determine whether the one or more of the computing devices 220 and 230 has two gigabytes of storage space. For example, the resource component 281 may determine whether a computing device 220 has two gigabytes of free storage space. In another example, the resource component 281 may determine whether the computing device 220 can free up or reallocate two gigabytes of storage space, etc.). If the resource component 281 determines that the computing device 220 and 230 does not have two gigabytes of storage space for the integration testing stage, the resource component 281 may provide an indication to a user of the system architecture 200, indicating that the estimated amount of space is not available. For example, the resource component may present a display a message (e.g., an error message, a warning message, etc.) via a graphical user interface (GUI) of the resource component 281. In another example, the resource component 281 may transmit a message (e.g., an email, a chat message, a text message, etc.) to one or more users of the development system 210 indicating that the development system 210 does not have sufficient resources for the next or later stage.

In one embodiment, the resource component 281 may configure the set of computing resources of the development system 210 based on the estimated resource usage. For example, if the resource component 281 determines that an estimated amount of resources will be used by the development system (e.g., determines the estimated resource usage) in the later or next stage, the resource component 281 may configure the estimated amount of resources in preparation for the later or next stage. The resource component 281 may configure the set of computing resources in response to determining that the development system 210 has sufficient resources for the next stage or later stage. For example, the resource component 281 may configure the set of computing resources in response to determining that the development system 210 has enough available resources (e.g., enough free resources) or can allocate enough resources to satisfy or meet the estimated resource usage, as discussed in more detail below. The resource component 281 may configure the set of computing resources of the development system 210 for the next or later stage, during the current stage. For example, the resource component 281 may configure the set of computing resources of the development system 210 for the next or later stage, while the current stage is in progress (e.g., simultaneous with the current stage).

In some embodiments, the resource component 281 may configure the estimated amount of resources by allocating the estimated amount of resources. Allocating the estimated amount of resources may include allocating storage space, allocating memory space (e.g., allocating an amount of RAM), allocating processing devices (e.g., allocating CPUs or virtual CPUs), allocating VMs (e.g., creating one or more VMs), allocating containers (e.g., creating one or more containers), etc.

In other embodiments, the resource component 281 may configure the estimated amount of resources by reserving the estimated amount of resources of the development system 210. Reserving the estimated amount of resources may include setting a flag, parameter, indicator, etc., that one or more resources are to be used for the later or next stage of the development pipeline. This may help prevent the resources from being allocated for other purposes. For example, this may prevent the resources from being allocated to another development stage of another application. Other appropriate methods, actions, functions, operations, etc., for reserving a resource (e.g., updating a schedule or table, etc.) may be used to reserve or hold one or more resources for the later or next stage of the development pipeline in other embodiments.

In further embodiments, resource component 281 may configure the estimated amount of resources by reallocating resources that were used in previous stages of the development pipeline for the application. For example, the development system 210 may currently be in a unit testing stage for an application. The development system 210 may use a number of VMs (e.g., resources) during the unit testing stage. One or more of the VMs used during the unit testing stage may be reused or reallocated for an integration testing phase (e.g., for a next phase). The resources that were used for other development pipelines of other applications (which may also be using the development system 210) may also be reused or reallocated for the next or later stage of the application.

As discussed above, the resource component 281 may automatically determine the estimated resource usage of a next or later stage. For example, the resource component 281 may automatically determine the estimated resource usage of a next stage of the development pipeline when the development system 210 reaches a threshold point within the current stage (e.g., when the development system 210 is halfway through a current stage) or has performed a threshold number of actions, functions, operations, etc., for the current stage (e.g., when the development system has performed 80% of the tests in a unit testing stage). In another example, the resource component 281 may automatically determine the estimated resource usage of the next stage when the development system 210 is within a threshold time of completing the current stage (e.g., when the development system 210 is within two hours, twenty minutes, or some other appropriate time of completing the current stage). Also as discussed above, the resource component 210 may automatically configure one or more of the resources of the development system 210 for the next or later stage. For example, the resource component 281 may automatically configure one or more of the resources of the development system 210 for the next or later stage when the development system 210 reaches a threshold point within the current stage (e.g., when the development system 210 is three quarters of the way through a current stage) or has performed a threshold number of actions, functions, operations, etc., for the current stage (e.g., when the development system has performed 90% of the tests in a unit testing stage). In another example, the resource component 281 may automatically configure one or more of the resources of the development system 210 for the next or later stage when the development system 210 is within a threshold time of completing the current stage (e.g., when the development system 210 is within five minutes or some other appropriate time of completing the current stage). The resource component 281 may determine the estimated resource usage of a next or later stage and may configure one or more resources of the development system 210 at different times in the current stage.

The examples, embodiments, implementations, etc., described herein may allow users of the development system 210 (e.g., programmers, developers, etc., who are implementing, coding, writing, and testing an application) to more efficiently use the development system 210. By determining (e.g., automatically determining) an estimated resource usage of a next or later stage of a development pipeline and configuring (e.g., automatically configuring) the resources for the next or late stage, this may allow the development system 210 to help ensure the resources are allocated for the next stage so that there are fewer delays in the stages of the development pipeline. This may allow for a better prediction or estimate of the computing resources that may be used in each stage of the development pipeline. This may further allow for better prediction of the correlation between the computing resources used in the different stages (e.g., the amount of computing resources used in one stage may be indicative of the amount of computing resources used in a second stage). This may further allow the users of the development system 210 to have some advanced warning that there may be insufficient resources for a next or later stage, which in turn allows the users to request or allocate additional resources for the development system 210.

Figure 3:
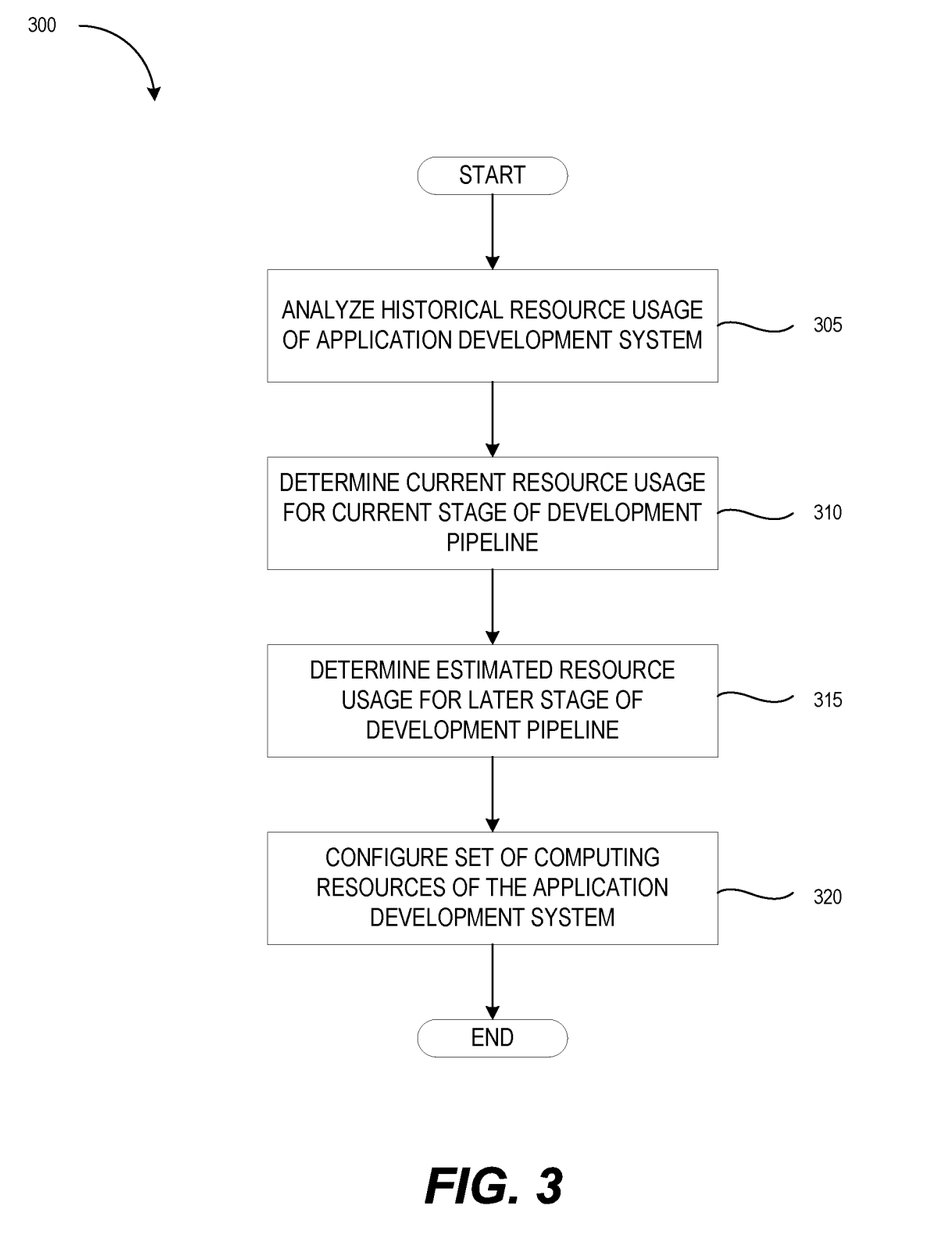
FIG. 3 is a flow diagram of a method of managing resources of a development system, in accordance with some embodiments of the present disclosure.

FIG. 3 is a flow diagram of a method 300 of operating a web application in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a resource component (e.g., resource component 281 illustrated in FIG. 2) and/or a computing device (e.g., computing device 280 illustrated in FIG. 2).

The method 300 begins at block 305, where the method 300 analyzes the historical resource usage of the application development system, as discussed above. For example, the method 300 may analyze that amount of resources used by the application development system for previous iterations of an application development pipeline for an application. In another example, the method 300 may analyze the amount of resources used by the application development system for previous iterations of application development pipelines for other applications that may be similar to the current application (e.g., other applications that may use the same libraries, same modules, perform the same functions or operations, etc.). At block 310, the method 300 may determine the current resource usage for a current stage of the development pipeline, as discussed above. For example, the method 300 may determine the amount of memory (e.g., RAM), storage space, processing power, VMs, containers, etc., used during the current stage of the development pipeline for the application.

At block 315, the method 300 may determine an estimated resource usage for a later stage of the development pipeline, based on one or more of the historical resource usage and the current resource usage of the development system, as discussed above. For example, the historical resource usage for the development system may indicate that the next stage in the development pipeline will typically use two times the processing power as the current stage in the development pipeline. The method 300 determine (e.g., may estimate) that the processing power used for the next stage will be two times of current processing power used for the current stage. At block 320, the method 300 may configure the computing resources of the development system (e.g., the set of computing resources that the development system may use) based on the estimated resource usage, as discussed above. For example, if estimated resource usage was 50 gigabytes (GB) of storage space for the next (or later) stage of the development pipeline, the method 300 may allocate 50 GB of storage space in preparation of the next stage of the development pipeline. In another example, the method 300 may reserve or otherwise indicate that resources of the development system will be allocated for the next (or later) stage. For example, if a VM is being used for the current stage, the method 300 may set a flag or parameter, update a table, etc., to indicate that the VM should be reserved for the next (or later) stage.

Figure 4:
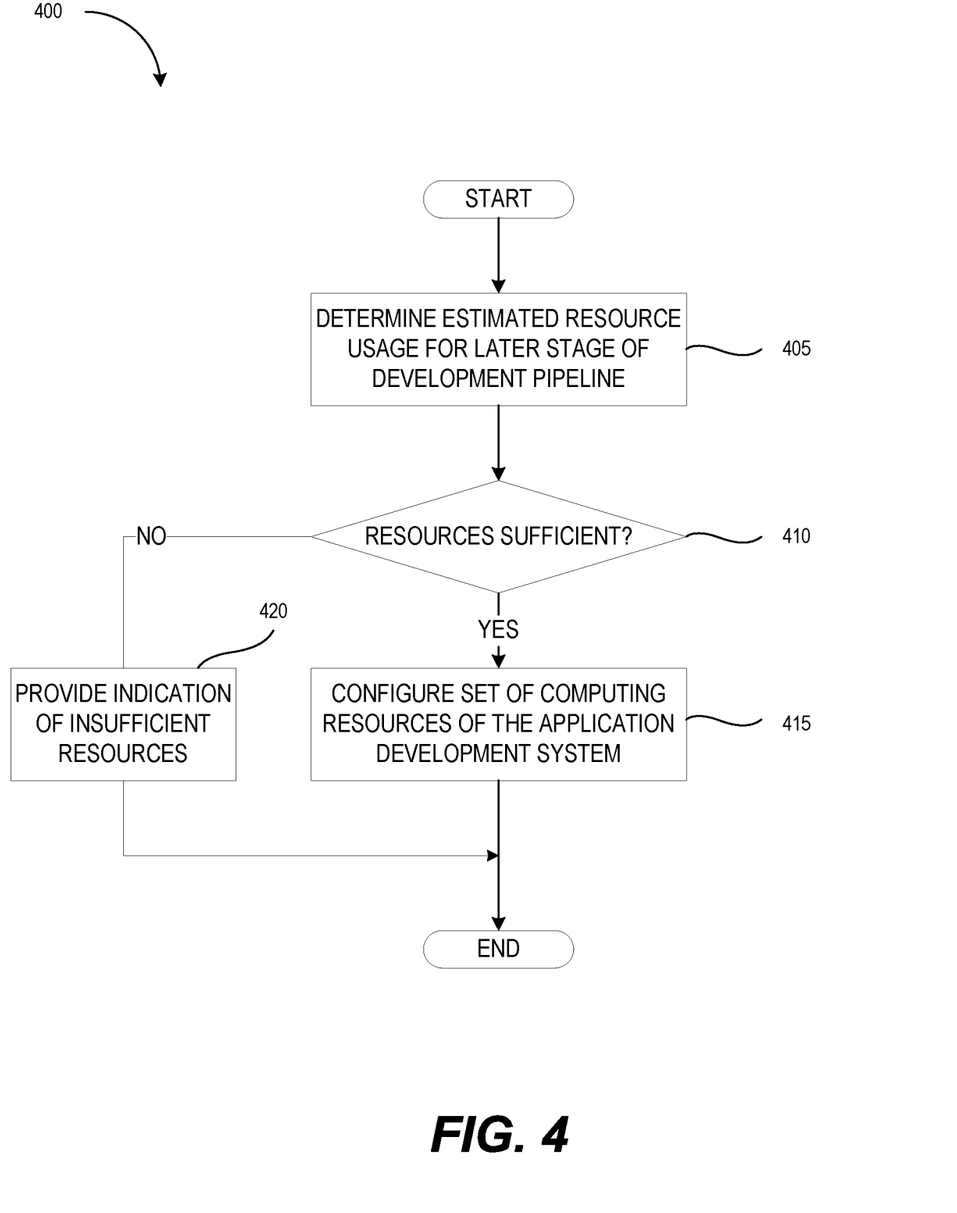
FIG. 4 is a flow diagram of a method of managing resources of a development system, in accordance with some embodiments of the present disclosure.

FIG. 4 is a flow diagram of a method 400 of operating a web application in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a resource component (e.g., resource component 281 illustrated in FIG. 2) and/or a computing device (e.g., computing device 280 illustrated in FIG. 2).

The method 400 begins at block 405, where the method 400 may determine an estimated resource usage for a later stage of a development pipeline, based on one or more of the historical resource usage and the current resource usage of a development system, as discussed above. For example, the historical resource usage for the development system may indicate that the next or later stage in the development pipeline will typically use three times the storage space as the current stage in the development pipeline. The method 400 determine (e.g., may estimate) that the storage used for the next or later stage will be three times of current storage space used for the current stage.

At block 410, the method 400 may determine whether the computing resources (e.g., the set of computing resources) of the development system are sufficient for the later (or next) stage of the development pipeline based on the estimated resource usage. For example, the method 400 may determine whether there are enough free (e.g., unused) resources available, based on the estimated resource usage. In another example, the method 400 may determine whether the total amount of resources in the development system would be sufficient, based on the estimated resource usage (e.g., whether there are enough available, and enough currently used resources that can be reserved or reallocated). If the computing resources of the development system are sufficient for the next or later stage, the method 400 may configure the computing resources of the development system (e.g., the set of computing resources that the development system may use) based on the estimated resource usage at block 415, as discussed above. For example, the method 400 may allocate or reserve resources for the next stage of the development pipeline. If the computing resources of the development system are not sufficient for the next or later stage, the method 400 may provide an indication that the computing resources are insufficient for the next or later stage, to one or more users of the development system at block 420. For example, the method 400 may present or display a message (e.g., an error message, a warning message, an informational message, etc.) to one or more users of the development system via a GUI. This may allow the users of the development system to have advanced warning or notice that the development system may not have enough computing resources for the next or later stage. For example, this may allow the users to have an indication that the computing resources may be insufficient for a later stage, before the later stage is reached. This may also allow the users of the development system to request additional computing resources in preparation for the later or next stage.

For example, this may allow users to request additional computing resources from a datacenter or a cloud computing architecture, before the later or next stage is reached.

Figure 5:
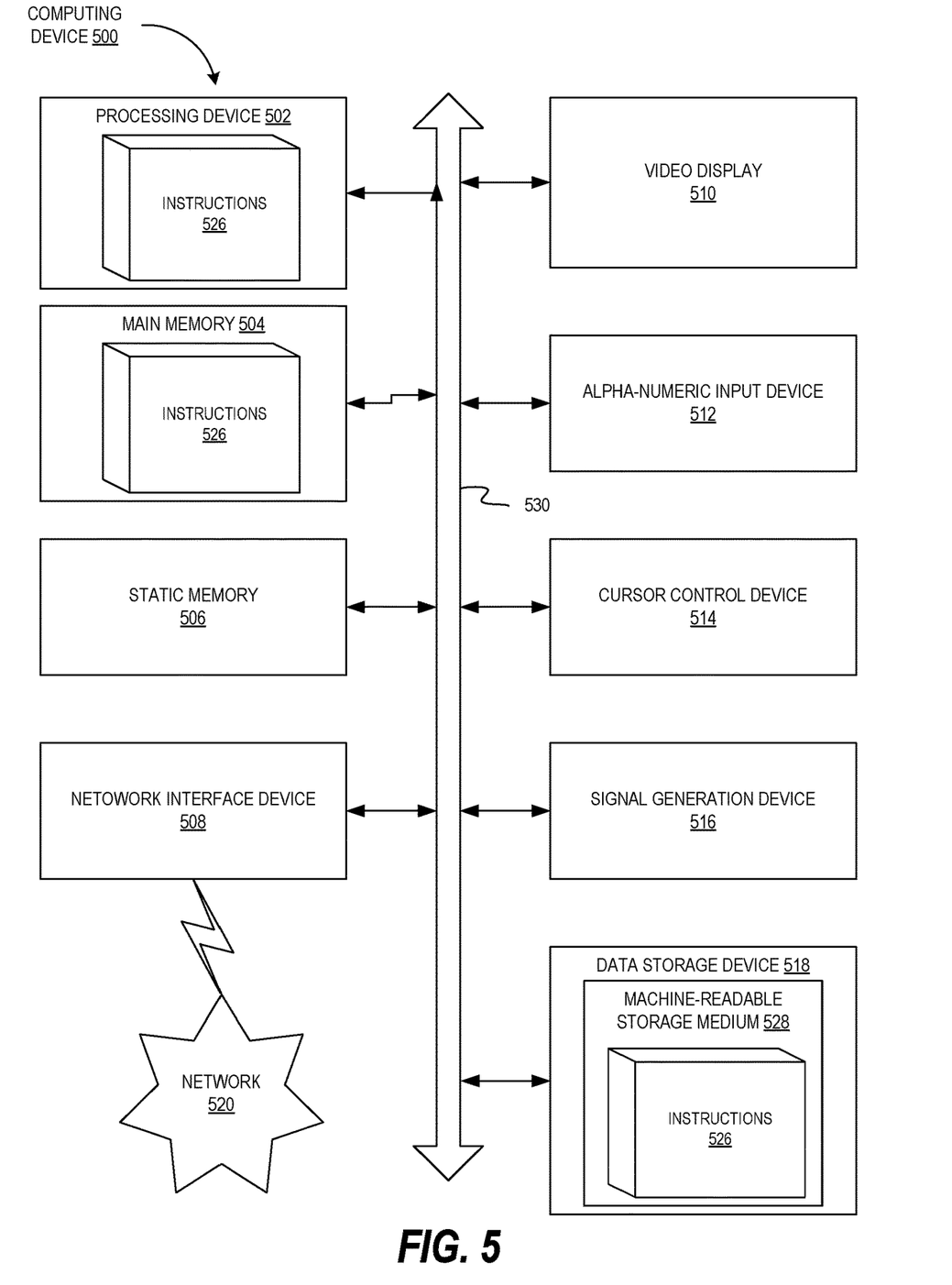
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Instructions 526 implementing a resource component (e.g., resource component 281 illustrated in FIG. 2) may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 6:
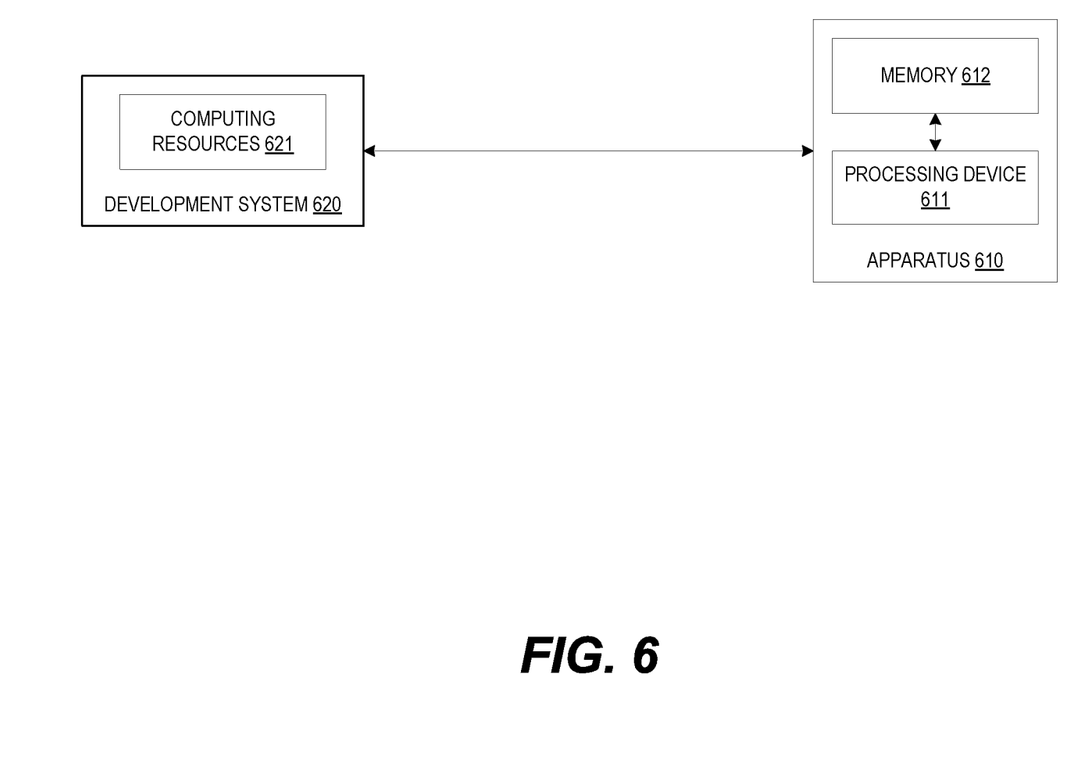
FIG. 6 is a block diagram of an example apparatus that may perform one or more of the operations described herein, in accordance with some embodiments

FIG. 6 is a block diagram of an example apparatus 610 that may perform one or more of the operations described herein, in accordance with some embodiments. The apparatus 610 includes a processing device 611 and a memory 612. The processing device 611 may be operatively coupled to the memory 612. The processing device 611 may analyze computing resources used by an application development system 620 during different stages of a development pipeline for an application. The application development system comprises a set of computing resources 621. The processing device 611 may also determine a current resource usage for a current stage of the development pipeline for the application. The processing device may further determine an estimated resource usage for a later stage of the development pipeline for the application. The processing device may further configure the set of computing resources 621 of the application development system 620 of the later stage of the development pipeline for the application based on the estimated resource usage Unless specifically stated otherwise, terms such as "analyzing," "determining," "configuring," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method by a resource component of a computing device, the method comprising:
    analyzing, by the resource component of the computing device and in an application development system, historical resource usage of a set of computational resources during each of different stages of a development pipeline for an application, wherein the application development system comprises the set of computing resources and the different stages of the development pipeline correspond to iterations of developing, testing, and deploying the application; and
    in response to the application development system reaching a threshold point within a current stage of the different stages of the development pipeline corresponding to iterations of developing, testing, and deploying the application, configuring without manual intervention, by a processing device of the resource component of the computing device, the set of computing resources of the application development system for a later stage of the development pipeline based on an estimated resource usage calculated by the resource component based on the historical resource usage analyzed, wherein the threshold point comprises at least one of: a threshold number of actions, a threshold number of functions, or a threshold number of operations.

2. The method of claim 1, further comprising:
    determining a current resource usage for the current stage of the development pipeline for the application; and
    determining the estimated resource usage for the later stage of the development pipeline for the application in view of the determining of the current resource usage.

3. The method of claim 1, wherein analyzing the historical resource usage of the application development system comprises analyzing the computing resources that are used, wherein the computing resources comprise at least one of: memory, processing power, network bandwidth, computing devices, virtual machines, or containers.

4. The method of claim 1, wherein analyzing the historical resource usage of the application development system comprises analyzing computing resources used by the application development system for other applications.

5. The method of claim 1, wherein the current stage comprises a unit testing stage and wherein the later stage comprises an integration testing stage.

6. The method of claim 1, wherein the current stage comprises an integration testing stage and wherein the later stage comprises a system testing stage.

7. The method of claim 1, wherein the current stage comprises a system testing stage and the later stage comprises a deployment stage.

8. The method of claim 1, wherein configuring the set of computing resources of the application development system for the later stage comprises reducing an amount of delay when the development system moves to the later stage of the development pipeline.

9. The method of claim 1, further comprising determining whether the set of computing resources is sufficient for the later stage of the development pipeline based on the estimated resource usage.

10. The method of claim 9, wherein the set of computing resources is configured in response to determining that the set of computing resources is sufficient based on the estimated resource usage.

11. The method of claim 9, further comprising providing an indication that the set of computing resources is insufficient in response to determining that the set of computing resources is insufficient for based on estimated resource usage.

12. The method of claim 1, wherein the estimated resource usage for the later stage of the development pipeline is automatically determined during the current stage of the development pipeline for the application.

13. An apparatus of a resource component of a computing device, the apparatus comprising:
a memory to store data;
a processing device operatively coupled to the memory, the processing device to:
analyze, in an application development system, historical resource usage of a set of computational resources during different stages of a development pipeline for an application, wherein the application development system comprises the set of computing resources and the different stages of the development pipeline correspond to iterations of developing, testing, and deploying the application; and
in response to the application development system reaching a threshold point within a current stage of the different stages of the development pipeline corresponding to iterations of developing, testing, and deploying the application, configure, without manual intervention, the set of computing resources of the application development system for a later stage of the development pipeline based on an estimated resource usage calculated by the resource component based on the historical resource usage analyzed, wherein the threshold point comprises at least one of: a threshold number of actions, a threshold number of functions, or a threshold number of operations.

14. The apparatus of claim 13, wherein the processing device further to:
determine a current resource usage for the current stage of the development pipeline for the application;
determine the estimated resource usage for the later stage of the development pipeline for the application; and
determine whether the set of computing resources is sufficient for the later stage of the development pipeline based on the estimated resource usage.

15. The apparatus of claim 13, wherein to analyze the historical resource usage of the application development system the processing device is further to analyze computing resources used by the application development system for other applications.

16. The apparatus of claim 13, wherein the current stage comprises a unit testing stage and wherein the later stage comprises an integration testing stage.

17. The apparatus of claim 13, wherein the current stage comprises an integration testing stage and wherein the later stage comprises a system testing stage.

18. The apparatus of claim 13, wherein the current stage comprises a system testing stage and the later stage comprises a deployment stage.

19. The apparatus of claim 13, wherein the processing device is further to provide an indication that the set of computing resources is insufficient in response to determining that the set of computing resources is insufficient for based on estimated resource usage.

20. A non-transitory computer-readable storage medium including instructions that, when executed by a processing device of a resource component of a computing device, cause the processing device to:
analyze, in an application development system, historical resource usage of a set of computational resources during different stages of a development pipeline for an application, wherein the application development system comprises the set of computing resources and the different stages of the development pipeline correspond to previous iterations of developing, testing, and deploying the application; and
in response to the application development system reaching a threshold point within a current stage of the different stages of the development pipeline corresponding to iterations of developing, testing, and deploying the application, configure, without manual intervention, the set of computing resources of the application development system for a later stage of the development pipeline based on an estimated resource usage calculated based on the historical resource usage, wherein the threshold point comprises at least one of: a threshold number of actions, a threshold number of functions, or a threshold number of operations.

* * * * *